(12) United States Patent
Fukuda et al.

(10) Patent No.: US 11,582,069 B2
(45) Date of Patent: Feb. 14, 2023

(54) NETWORK CONTROL DEVICE, USER TERMINAL, COMMUNICATION SYSTEM, NETWORK CONTROL METHOD, AND NETWORK CONTROL PROGRAM

(71) Applicant: Nippon Telegraph and Telephone Corporation, Tokyo (JP)

(72) Inventors: Aki Fukuda, Tokyo (JP); Yoshinori Koike, Tokyo (JP); Hitoshi Irino, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 104 days.

(21) Appl. No.: 17/251,047

(22) PCT Filed: Jun. 7, 2019

(86) PCT No.: PCT/JP2019/022679
§ 371 (c)(1),
(2) Date: Dec. 10, 2020

(87) PCT Pub. No.: WO2019/240024
PCT Pub. Date: Dec. 19, 2012

(65) Prior Publication Data
US 2021/0250203 A1 Aug. 12, 2021

(30) Foreign Application Priority Data
Jun. 13, 2018 (JP) .............................. JP2018-112968

(51) Int. Cl.
*H04L 41/40* (2022.01)
*H04L 12/46* (2006.01)
(Continued)

(52) U.S. Cl.
CPC .......... *H04L 12/4633* (2013.01); *H04L 41/12* (2013.01); *H04L 63/0876* (2013.01)

(58) Field of Classification Search
CPC . H04L 12/4633; H04L 41/12; H04L 63/0876; H04L 41/0803; H04L 41/0895;
(Continued)

(56) References Cited

U.S. PATENT DOCUMENTS 9,900,219 B2 * 2/2018 Huey ...................... H04Q 1/13
10,116,499 B2 * 10/2018 Kumar .................. H04L 67/567
(Continued)

FOREIGN PATENT DOCUMENTS

JP 2014154966 8/2014
JP 2017-34365 2/2017
(Continued)

OTHER PUBLICATIONS

Singh et al., VXLAN and EVPN for Data Center Network Transformation, IEEE, 6 pages, 2017.*
Ruano, Creation of a Virtual Overlay Network With SDN and VXLAN, Thesis, Barcelona Tech, 115 pages, Jun. 2017.*
(Continued)

*Primary Examiner* — Frank Duong
(74) *Attorney, Agent, or Firm* — Fish & Richardson P.C.

(57) ABSTRACT

A tunnel connection is enabled between a user terminal and a service provider using a simpler network configuration.
A communication system 10 includes a user terminal 20, a service provider 30, a carrier network 40 that connects the user terminal 20 and the service provider 30 to each other, and a network control device 50 that controls the carrier network 40. The network control device 50 sets respective virtual tunnel end points (VTEPs) for a POI terminal 46 that is on the carrier network 40 and that is connected to the service provider 30 and for the user terminal 20, and sets a virtual tunnel between the virtual tunnel end points. The user terminal 20 communicates with the service provider 30 via the virtual tunnel.

11 Claims, 11 Drawing Sheets

(51) Int. Cl.
*H04L 41/12* (2022.01)
*H04L 9/40* (2022.01)

(58) Field of Classification Search
CPC ..... H04L 41/122; H04L 41/40; H04L 45/586; H04L 45/66; H04L 63/108; H04L 2012/4629; H04L 63/0236; H04L 63/08
See application file for complete search history.

(56) References Cited

U.S. PATENT DOCUMENTS

| | | | |
|---|---|---|---|
| 10,868,697 B2* | 12/2020 | Gao | H04L 69/22 |
| 2015/0180673 A1* | 6/2015 | Kuwata | H04L 12/185 370/254 |
| 2016/0210209 A1* | 7/2016 | Verkaik | G06F 11/3051 |
| 2016/0254968 A1* | 9/2016 | Ebtekar | H04L 41/12 709/223 |
| 2019/0045012 A1 | 2/2019 | Takajo et al. | |
| 2019/0268383 A1* | 8/2019 | Maino | H04L 12/4633 |

FOREIGN PATENT DOCUMENTS

| | | |
|---|---|---|
| JP | 2017-59991 | 3/2017 |
| WO | WO 2017/150621 | 9/2017 |

OTHER PUBLICATIONS

Technical Report, TR-328, Virtual Business Gateway, broadband forum, 87 pages, Jul. 2017.*
[No Author Listed], "Full-Fledged IPv6 Service Tunnel and Two Native Methods," Nikkei Network, Mar. 28, 2011, pp. 41-45, 13 pages (with English Translation).
[No Author Listed], "ISP Tsuru Teruaki—It looks like the Current FLET'S," Nikkei Communications, Mar. 15, 2008, p. 55, 3 pages (with English Translation).
Fukuda et al., "A study of applying SDN to the operational challenges of multi-service wide-area IP network," National Institute of Electronics, Information and Communication Technology, Technical Report, 2018, 118(109):67-72, 15 pages (with English Translation).
Ikegami et al., "Complete Reform of the Network by Software-Defined Network," Unisys Technology Review, Dec. 2015, 35(3):39-48, 23 pages (with English Translation).
Mamakos et al., "A Method for Transmitting PPP Over Ethernet (PPPoE)," Network Working Group, Feb. 1999, 17 pages.
Rigney et al., "Remote Authentication Dial in User Service (RADIUS)," Network Working Group, Jun. 2000, 75 pages.
Tamura, "Openflow—The World's Easiest-to-Understand SDN Commentary: Automatically Constructing Networks Using Software," Nikkei Network, Apr. 28, 2013, pp. 34-41, 17 pages (with English Translation).

* cited by examiner (a)

(b)

| 600 | 602 | 604 | 606 | 608 | 610 | 612 |
|---|---|---|---|---|---|---|
| | CARRIER NETWORK USER ID | TERMINAL ID | I/F | User MAC Add. | IP Add. | VNI |
| | | | | | | |
| | | | | | | |

Fig. 6

| 700 | 702 | 704 | 706 | 708 |
|---|---|---|---|---|
| | Node ID | MAC Add. | IP Add. | I/F |
| | | | | |
| | | | | |

Fig. 7

NETWORK CONTROL DEVICE, USER TERMINAL, COMMUNICATION SYSTEM, NETWORK CONTROL METHOD, AND NETWORK CONTROL PROGRAM

CROSS-REFERENCE TO RELATED APPLICATIONS

This application is a National Stage application under 35 U.S.C. § 371 of International Application No. PCT/JP2019/022679, having an International Filing Date of Jun. 7, 2019, which claims priority to Japanese Application Serial No. 2018-112968, filed on Jun. 13, 2018. The disclosure of the prior application is considered part of the disclosure of this application, and is incorporated in its entirety into this application.

TECHNICAL FIELD

The present disclosure relates to a communication system that connects a user terminal and a service provider to each other via a carrier network, a user terminal that uses the communication system, a network control device that controls the communication system, a network control method, and a network control program.

BACKGROUND ART

A service provider that provides Internet services and a user terminal that uses the services have been conventionally connected to each other via a carrier network (or a wide area multi-service network).

FIG. 13 is an explanatory diagram illustrating a configuration of a communication system according to a conventional art.

This communication system 110 is configured to include user terminals (end user terminals) 120 such as a home gateway, service providers 130 that provide services using the Internet 132, and a carrier network 140 that connects these elements to each other (e.g., a line concentration carrier network provided by a telecommunications carrier).

The carrier network 140 is an IP network and is configured to include edge devices 142 (such as a router) that are connected to the user terminals 120, relay devices 144 (such as a router), and Point Of Interface (POI) terminals 146 (such as a gateway router) connected to the service providers 130.

Various methods can be contemplated for establishing a connection with the service provider network using the carrier network. Among these, when the following tasks in operation of the carrier network are considered, tunnel connection schemes are regarded as being particularly advantageous, and thus Point-to-Point Protocol over Ethernet (PPPoE) with a user authentication function has been currently generally used (see, for example, Non Patent Literatures 1 and 2).

Examples of the tasks in operation of the carrier network that need to be taken into consideration include the following:

Achieving Flexibility for POI

Path changes (PO selections) in response to positional changes in a plurality of POIs between the service provider network and the carrier network need to be supported.

More specifically, the following methods are, for example, used: a POI selection method in a case where a POI is provided independently for each service upon request from the service provider; and a PO selection method in a case where the same service provider is connected to a plurality of POIs for the sake of redundancy.

An example of a method for achieving this may include: selecting an appropriate POI by establishing a tunnel connection between an end user terminal and a PO terminal on the basis of a service according to the contract signed by a user; and further determining a POI to be connected by applying a POI selection algorithm in which the number of sessions and the like are taken into consideration.

Interconnection Between IPv6 and IPv4 Networks

To prepare for IPv6 to be used as the IP protocol of the carrier network in the future market, interconnection needs to be achieved between the carrier network (IPv6) and the service provider network operating with IPv4.

As a method for achieving this, v4 packets are transferred within the carrier network using IPv6 tunneling and the v6 tunneling is terminated at a POI (decapsulating), which enables v4/v6 interconnection.

Independent Communications for Each Contract Service

In the carrier network, communications need to be independently implemented for each service according to a contract signed by an end user to guarantee reliability.

Furthermore, the number of connections needs to be recognized for each service, and a user authentication function is also needed for the connection to the service.

As a method for achieving this, a tunnel may be separately provided for each service to make the communications independent. Furthermore, a PPPoE session management function, Radius (see Non Patent Literature 3), and the like are used in combination to achieve the safety such as user authentication.

In addition, in carrier networks, establishment and operation of a reliable network are required including network resource management such as a continuous increase in transfer capacity of the network for an increase in the traffic demand in the future and the like.

CITATION LIST

Non Patent Literature

Non Patent Literature 1: "IPS connection, looks exactly like the existing FLET'S" Nikkei Communications, Nikkei Business Publications, Inc., Mar. 15, 2008, page 55
Non Patent Literature 2: "RFC2516: a Method for Transmitting PPP Over Ethernet (PPPoE)" [online], [Searched on May 28, 2018], Internet <URL: http://www.ietf.org/rfc/rfc2516.txt>
Non Patent Literature 3: "RFC2865: Remote Authentication Dial In User Service (RADIUS)" [online], [Searched on May 28, 2018], Internet <URL: https:/tools.ietf.org/rfc/rfc2865.txt>

SUMMARY OF THE INVENTION

Technical Problem

FIG. 14 is an explanatory diagram schematically illustrating an example of a protocol stack for a tunnel connection scheme according to a conventional art.

In PPPoE, a PPP session is established after an end-to-end PPPoE connection is established, and then a tunnel connection is implemented, so that a protocol stack is layered.

One reason why PPPoE is generally used is utilization of the PPP-based user authentication function. To implement this function, user authentication on the edge device 142 that receives access from the user terminal 120 is essential. This is for checking whether the user is under contract with the carrier and which service provider is under contract with the user and allocating the user to the PO of the corresponding service provider. When a plurality of POI terminals 146 are connected to the same service provider for the sake of redundancy, it is necessary to further provide a function for selecting the POI terminal 146 to be connected on each occasion while taking the number of sessions on the edge device 142 and the like into consideration.

On the other hand, a communication system involving more functions related to path control and authentication results in a higher failure risk and a higher operation risk.

The present disclosure is made in view of such a circumstance, and an object of the present disclosure is to enable a tunnel connection between a user terminal and a service provider using a simpler network configuration compared with conventional schemes.

Means for Solving the Problem

The invention according to a first aspect for achieving the object is a network control device configured to control a carrier network connecting a user terminal and a service provider to each other, the network control device including a virtual network setting unit configured to set a virtual network on the carrier network, wherein the virtual network setting unit includes a virtual tunnel setting unit configured to set respective virtual tunnel end points for a point of interface that is on the carrier network and that is connected to the service provider and for the user terminal and set a virtual tunnel between the virtual tunnel end points.

The invention according to a fifth aspect is a user terminal configured to be connected to the network control device according to the first aspect and to be connected to a service provider via a carrier network on which a virtual network is formed, wherein virtual tunnel end points of a virtual tunnel set by the network control device between the user terminal and the service provider are set, and thus the user terminal communicates with the service provider via the virtual tunnel.

The invention according to a sixth aspect is a communication system including a user terminal, a service provider, a carrier network configured to connect the user terminal and the service provider to each other, and a network control device configured to control the carrier network, wherein the network control device includes a virtual network setting unit configured to set a virtual network on the carrier network, the virtual network setting unit includes a virtual tunnel setting unit configured to set respective virtual tunnel end points for a point of interface that is on the carrier network and that is connected to the service provider and for the user terminal and set a virtual tunnel between the virtual tunnel end points, and the user terminal communicates with the service provider via the virtual tunnel set by the network control device.

The invention according to a seventh aspect is a network control method for a network control device configured to control a carrier network connecting a user terminal and a service provider to each other, the method including setting, by the network control device, a virtual network on the carrier network, and setting, by the network control device, respective virtual tunnel end points for a point of interface that is on the carrier network and that is connected to the service provider and for the user terminal and setting a virtual tunnel between the virtual tunnel end points.

The invention according to an eighth aspect is a network control program for causing a computer to execute the network control method according to the seventh aspect.

With the configuration, the number of functions involved in path control in the communication system can be reduced, and a tunnel connection between the user terminal and the service provider can be implemented with a simpler network configuration compared with the conventional art.

The invention according to a second aspect is the network control device according to the first aspect, wherein the network control device stores a service identifier for identifying the service provider and the point of interface connected to the service provider in association with each other, the network control device stores a user identifier for identifying the user terminal and the service identifier of the service provider connected to the user terminal in association with each other, and the virtual tunnel setting unit of the network control device identifies the user terminal based on the user identifier to set one of the virtual tunnel end points for the user terminal and sets the other one of the virtual tunnel end points for the point of interface associated with the service identifier of the service provider connected to the user terminal.

With the configuration, the virtual tunnel connecting the user terminal and the service provider to each other can be set by the network control device.

The invention according to a third aspect is the network control device according to the first aspect further comprising an authentication processing unit configured to execute authentication processing based on authentication information transmitted from the user terminal, when communications using the virtual tunnel are started.

With the configuration, only the authorized user terminal can be permitted to perform the communications using the virtual tunnel, whereby safety of the communications can be improved. Furthermore, with the network control device executing the authentication processing, a simpler network configuration can be implemented.

The invention according to a fourth aspect is the network control device according to the third aspect, wherein the authentication processing unit executes the authentication processing using, as the authentication information, information including at least one of the user identifier for identifying the user terminal, a terminal identifier unique to the user terminal, or a tunnel identifier for identifying the virtual tunnel set for the user terminal.

With the configuration, authentication accuracy can be improved, whereby the safety of the communications can further be improved.

Effects of the Invention

With the present disclosure, a tunnel connection can be established between a user terminal and a service provider using a simpler network configuration compared with conventional schemes.

BRIEF DESCRIPTION OF DRAWINGS

FIG. 6 is a diagram illustrating details of user management information.

FIG. 7 is a diagram illustrating details of device address management information in the carrier network.

DESCRIPTION OF EMBODIMENTS

A preferred embodiment (hereinafter referred to as "embodiment") of a network control device, a user terminal, a communication system, a network control method, and a network control program according to the present disclosure will be described in detail with reference to the accompanying drawings.

Figure 1:
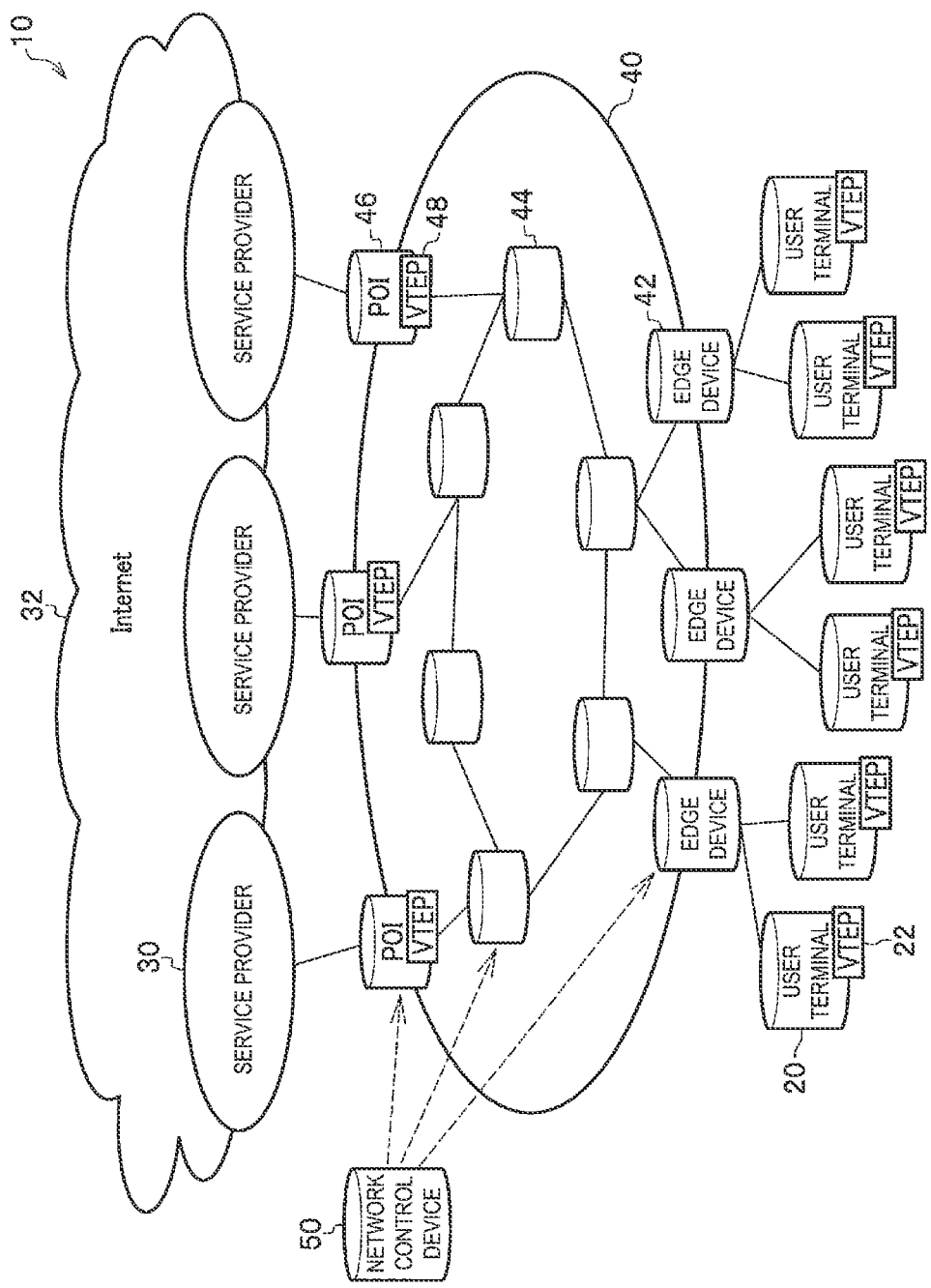
FIG. 1 is a diagram illustrating a configuration of a communication system according to a present embodiment.

FIG. 1 is a diagram illustrating a configuration of a communication system 10 according to the present embodiment.

The communication system 10 includes user terminals (end user terminals) 20, service providers 30, a carrier network 40 that connects the user terminals 20 and the service providers 30 to each other, and a network control device 50 that controls the carrier network 40.

Each of the user terminals 20 is a home gateway device or the like, and each of the service providers 30 is a system that provides Internet services, such as a connection service to the Internet 32.

The carrier network 40 is an IP network and is configured to include edge devices 42 (such as a router) that are connected to the user terminals 20, relay devices 44 (such as a router), and POI terminals 46 (such as a gateway router) connected to the service providers 30.

The network control device 50 is a server, a personal computer (PC), or the like functioning as a Software-Defined Network (SDN) controller.

The network control device 50 controls all of the devices in the carrier network 40, and a device setting management channel and a path control channel are assumed to be set in advance, in an in-channel format, between the network control device 50 and the devices.

IP addressing (underlay addressing) required for IP communications within the carrier network 40 is assumed to be set in advance on the basis of a conventional operation scheme, and communications among the devices within the network are assumed to be established in advance. An example of the conventional operation scheme includes a method in which the edge device 42 receiving access from the user terminals 20 assigns an IP address to each device by using DHCP (DHCPv6) protocol.

Figure 2:
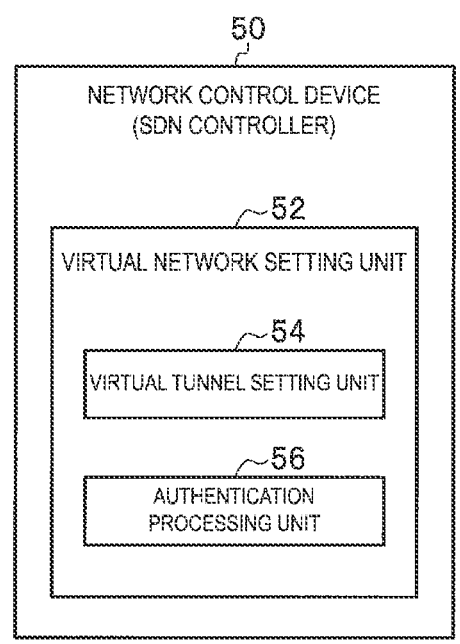
FIG. 2 is a block diagram illustrating a functional configuration of a network control device according to the present embodiment.

FIG. 2 is a block diagram illustrating a functional configuration of the network control device 50.

The network control device 50 functions as a virtual network setting unit 52, a virtual tunnel setting unit 54, and an authentication processing unit 56. Note that the network control device 50 includes a control unit, an input/output unit, and a storage unit, none of which is illustrated, for executing processing of the virtual network setting unit 52 and the like. The storage unit stores a program (network control program) for executing each processing of the control unit.

The virtual network setting unit 52 sets a virtual network on the carrier network 40.

Specifically, the virtual network setting unit 52 forms a software-based virtual network (specifically, a Virtual eXtensible Local Area Network (VXLAN)) on a physically configured network (carrier network 40).

The virtual tunnel setting unit 54 sets virtual tunnel end points (VXLAN Tunnel End Points (VTEPs)) 22 and 48, respectively for the user terminal 20 and the POI terminal 46 (point of interface) that is on the carrier network 40 and that is connected to the service provider 30 (see FIG. 1), and sets a virtual tunnel between the VTEPs 22 and 48.

The authentication processing unit 56 executes authentication processing on the basis of authentication information transmitted from the user terminal 20 when communications using the virtual tunnel are started.

Thus, in the present embodiment, the network control device 50 serving as an SDN controller has a function of setting a VXLAN-based tunnel between the user terminal 20 and the POI terminal 46 and a user authentication function.

Information (authentication information) about a user contract between the user (user terminal 20) and the carrier and the service provider is collected in the network control device 50, and the VXLAN tunnel is set between the user terminal 20 and the POI terminal 46 on the basis of this information. The network control devices 50 is further in charge of the user authentication function, and thus the tunnel setting/control and user authentication equivalent to those in conventional schemes (PPPoE tunnel and Radius based authentication) can be implemented with network configuration/operation that is simpler compared with the conventional schemes.

Note that VXLAN is an example, and other tunnel setting protocols may be used.

Hereinafter, processing executed by the network control device 50 will be described in detail.

First of all, information used by the network control device 50 for path control in the carrier network 40 will be described with reference to FIGS. 3 to 7.

Figure 3:
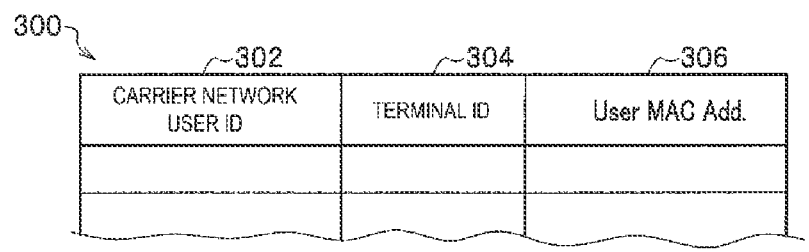
FIG. 3 is a diagram illustrating details of registered user information.

FIG. 3 illustrates registered user information 300 in which a carrier network user ID 302 (user identifier) assigned by the carrier to the user terminal 20, a terminal ID 304 (terminal identifier) for the carrier to identify the user terminal 20, and a MAC address (User MAC Add) 306 of the user terminal 20 are associated with each other.

The carrier network user ID 302 is information that is assigned when the user is registered in the carrier (user registration), and is transmitted to the user (user terminal 20). The terminal ID 304 is a unique ID that is provided by the carrier to the user terminal 20 when the user terminal 20 is installed at home. For example, the registered user information 300 is stored in advance in the network control device 50 with the carrier network user ID 302, the terminal ID 304, and the MAC address 306 associated with each other, when the user registration is performed by the user terminal 20.

Assuming that there may be a user attempting an inappropriate service connection through MAC address spoofing, the network control device 50 can determine an appropriate connection by not only checking the MAC address but also checking the terminal ID at the time of the later described user authentication (connection authentication) performed when the communications using a tunnel are started.

Figure 4:
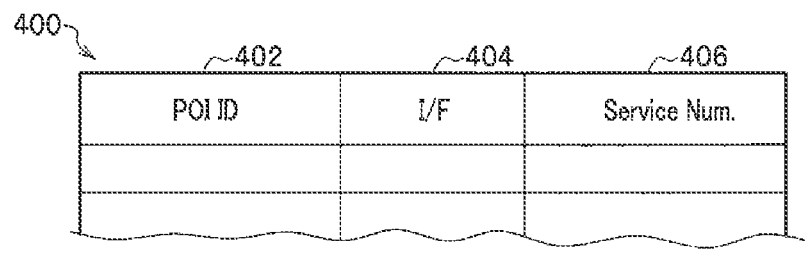
FIG. 4 is a diagram illustrating details of PO accommodation information.

FIG. 4 illustrates PO accommodation information 400 in which a POI ID 402 that is an identifier of each PO terminal 46 defined by the carrier network 40, an I/F 404 for identifying an interface of the POT terminal 46 that is connected to the service provider 30, and a service number (Service Num) 406 for identifying the service provider 30 connected to the interface are recorded in association with each other. The service number 406 corresponds to a service identifier in the claims.

Figure 5:
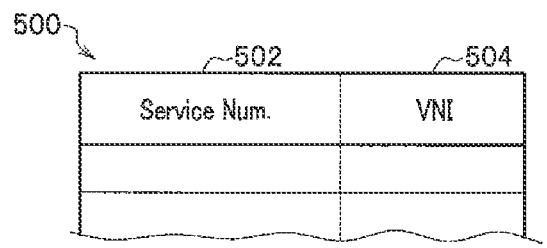
FIG. 5 is a diagram illustrating details of basic information about VXLAN set in a carrier network.
Figure 5:
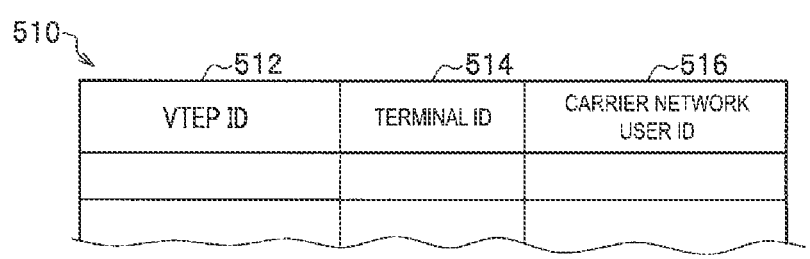

FIG. 5 illustrates basic information about the VXLAN set on the carrier network 40. FIG. 5(a) illustrates a correspondence table 500 showing the correspondence between a VXLAN Network Identifier (VNI), defined by the carrier, and the service provider 30. In the table, a service number (Service Num) 502 for identifying the service provider 30 and a VNI 504 are associated with each other.

FIG. 5(b) illustrates VTEP deployment information 510, which is L2 topology information, in the user terminal 20, in which an identifier (VTEP ID) 512 of the VXLAN tunnel end point (VTEP), a terminal ID 514 of the user terminal 20 for which the VTEP is set, and a carrier network user ID 516 are associated with each other. The VTEP ID 512 is assigned by the carrier to the user terminal 20 for which the VTEP is set.

FIG. 6 illustrates user management information (information associated with each user terminal 20) 600 in which a carrier network user ID 602 of the user terminal 20, a terminal ID 604 of the user terminal 20, an interface (I/F) 606 of the user terminal 20, a MAC address (user MAC Add) 608 of the user terminal 20, an IP address (IP Add) 610 set for the user terminal 20, and a VNI 612 used by the user terminal 20 are associated with each other.

FIG. 7 illustrates device address management information 700 for managing the addresses of the devices in the carrier network 40, in which an identifier (Node ID) 702 of a device (relay device 44 and edge device 42) in the carrier network 40, a MAC address (MAC Add) 704 of the device, an IP address (IP Add) 706 assigned to the device, and an interface (I/F) 708 for which the IP address is set are associated with each other.

For example, the information illustrated in FIGS. 3 to 7 may be held in table form within the network control device 50, or may be stored in a database to be called and used by the network control device 50 as appropriate.

Processing Executed for Setting New Tunnel

Figure 8:
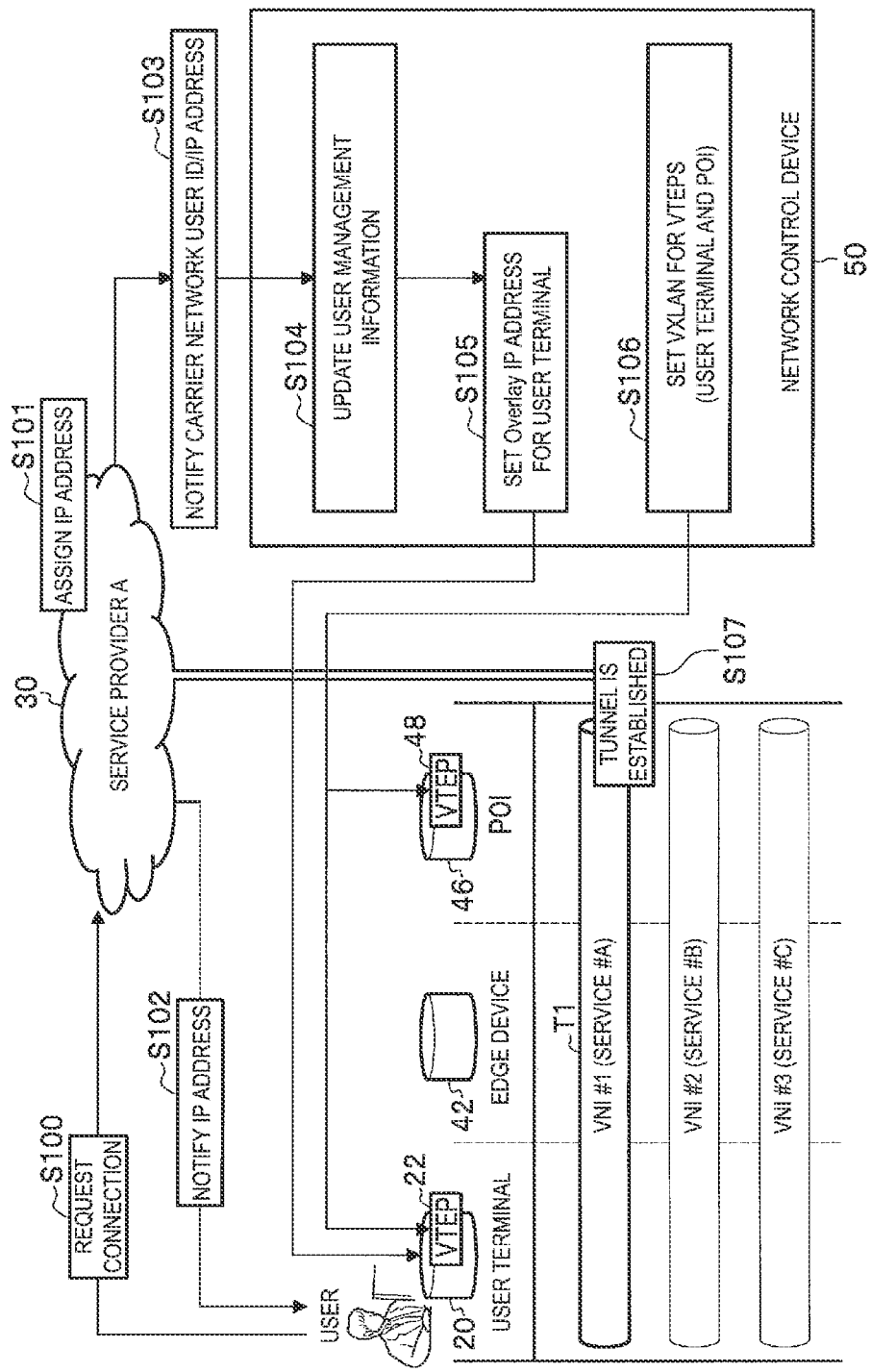
FIG. 8 is an explanatory diagram illustrating a flowchart of processing executed for setting a new tunnel.

FIG. 8 is an explanatory diagram illustrating a flowchart of processing executed for setting a new tunnel.

It is assumed that, prior to the processing illustrated in FIG. 8, the user (user of the user terminal 20) has performed user registration to the carrier, and a carrier network user ID (user identifier in the claims), which is a unique user identifier, has been assigned by the carrier to the user terminal 20.

When the carrier network user ID is assigned to the user terminal 20, the carrier network user ID 302, the terminal ID 304, and the MAC address 306 of the user terminal 20 are added to the registered user information 300 in FIG. 3.

First of all, the user issues a connection request to a desired service provider 30 ("service provider A" in the figure) from the user terminal 20 (step S100). This connection request includes the carrier network user ID. These steps correspond to a registration request phase.

Upon receiving the connection request, the service provider 30 assigns an IP address to the user terminal 20 (step S101), and notifies the user terminal 20 of the IP address thus assigned (step S102).

Furthermore, upon receiving the connection request, the service provider 30 notifies the network control device 50 of the carrier network user ID notified from the user terminal 20 and the IP address assigned to the user terminal 20 (customer control input, step S103). These steps correspond to a service provider operation phase.

Upon receiving the notification indicating the carrier network user ID and the IP address of the user terminal 20 from the service provider 30, the virtual tunnel setting unit 54 of the network control device 50 (hereinafter simply referred to as "network control device 50") updates the user management information 60 illustrated in FIG. 6 with reference to the registered user information 300 illustrated in FIG. 3 (step S104).

As described above, in the user management information 600, the carrier network user ID 602 of the user terminal 20, the terminal ID 604 of the user terminal 20, the interface 606 of the user terminal 20, the MAC address 608 of the user terminal 20, the IP address 610 set for the user terminal 20, and the VNI 612 used by the user terminal 20 are associated with each other. Of these pieces of information, the carrier network user ID 602 and the IP address 610 are notified from the service provider 30 in step S103.

The terminal ID 604 and the MAC address 608 are set with reference to the registered user information 300 illustrated in FIG. 3 by using the carrier network user ID 602.

The VNI 612 used by the user terminal 20 is set by retrieving the VNI 504 associated with the service number 502 of the service provider 30 (service provider A) that has issued the current notification, using the correspondence table 500 showing the correspondence between the VN illustrated in FIG. 5(a) and the service provider 30.

Next, with reference to the user management information 600 illustrated in FIG. 6, the network control device 50 sets the IP address (IP address 610 in FIG. 6) assigned by the service provider operator 30, as an overlay IP address, for an appropriate interface (interface 606 in FIG. 6) of the user terminal 20 (step S105).

Note that the IP address (IP address 610) assigned by the service provider 30 is set, for example, as the overlay IP address, for the interface (interface 606) of the user terminal 20 connected to the edge device 42 of the carrier network 40. The network control device 50 may collect the statuses of the user terminal 20 to set the interface 606 of the user terminal 20, or may set the interface 606 in advance.

Next, with reference to the user management information 600 illustrated in FIG. 6, the network control device 50 sets a VXLAN-based tunnel T1, by inputting the setting of the VXLAN for each VTEP (the user terminal 20 and the POI terminal 46) that is a setting target, on the basis of the MAC address of the user terminal 20 (MAC address 608 in FIG. 6) and the VNI (VNI 612 in FIG. 6) (step S106).

At this time, for the user side tunnel setting, the VTEP that is a setting target is identified from a user side VTEP list (512 in FIG. 5(*b*)), with reference to the carrier network user ID (516 in FIG. 5(*b*)) in the VTEP deployment information 510 (FIG. 5(*b*)) using the carrier network user ID 602 notified from the service provider 30 as the key. Thus, the tunnel for the VNI (612 in FIG. 6) is set.

On the other hand, for the POI side tunnel setting, the service number (502 in FIG. 5(*a*)) is identified with reference to the VNI (504 in FIG. 5(*a*)) in the correspondence table 500 (FIG. 5(*a*)) using the VNI (612 in FIG. 6) as the key, and then the POI ID (402 in FIG. 4) of the POI that is to be the VTEP is further identified with reference to the service number (406 in FIG. 4) in the PO accommodation information 400 (FIG. 4) using the service number as the key. Thus, the tunnel for the VNI (612 in FIG. 6) is set.

This setting may be performed, for example, with the network control device 50 inputting the setting directly into the user terminal 20, or by setting an L2 network connecting only the user terminal 20, the POI terminal 46, and the network control device 50 to each other using Ethernet VPN (EVPN) on the path control channel that has been laid and then by further advertising the MAC and IP addresses using MP-BGP.

Note that the PO terminal 46 for which the VTEP is set is identified by using the PO accommodation information 400 in FIG. 4.

As a result, a VXLAN tunnel connecting the user terminal 20 and the service provider 30 to each other is established (step S107). These steps correspond to a carrier (SDN controller) operation phase.

Specifically, the network control device 50 stores the user identifier (carrier network user ID) assigned by the carrier network, and also stores the PO accommodation information 400 (FIG. 4) in which the service identifier (service number) for identifying the service provider 30 and the PO terminal 46 (point of interface) connected to the service provider are associated with each other.

When requesting a new connection to the service provider 30, the user terminal 20 transmits the user identifier to the service provider 30, and the service provider 30 transmits the user identifier to the network control device 50.

The virtual tunnel setting unit 54 of the network control device 50 identifies the user terminal 20 on the basis of the user identifier to set one virtual tunnel end point (VTEP 22) for the user terminal 20, and sets the other virtual tunnel end point (VTEP 48) for the POI terminal 46 associated with the service identifier of the service provider 30.

User Authentication Processing

Figure 9:
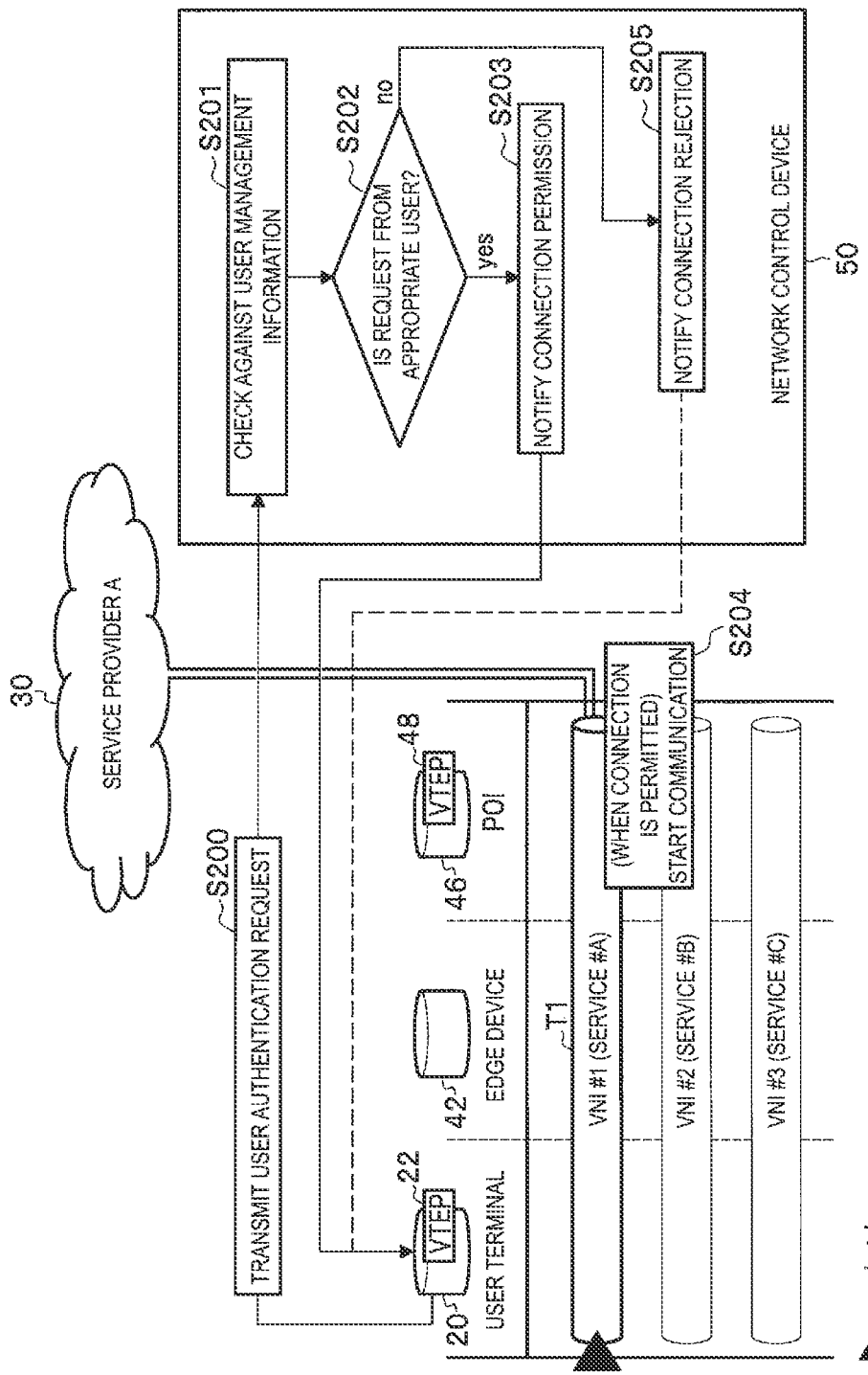
FIG. 9 is an explanatory diagram illustrating a flowchart of processing executed for user authentication in a tunnel operation.

FIG. 9 is an explanatory diagram illustrating a flowchart of processing executed for user authentication in a tunnel operation.

VXLAN is a stateless tunnel (a tunnel in which authentication information is not held), and thus the user authentication after the tunnel is formed is performed in response to packet-in from the user terminal 20.

First of all, the user terminal 20 transmits a user authentication request to the network control device 50 (step S200). The user authentication request includes the carrier network user ID, the terminal ID, the MAC address, the IP address, and the connection destination VNI of the user terminal 20. Note that the user authentication request (authentication request) may be information including at least one of the carrier network user ID, the terminal ID, or the connection destination VNI.

The authentication processing unit 56 of the network control device 50 (hereinafter, simply referred to as "network control device 50") checks the information included in the user authentication request against the user management information 600 in FIG. 6 (step S201), and determines whether the user authentication request is from an appropriate user (step S202).

When the user authentication request is from the appropriate user (step S202. Yes), the network control device 50 issues a connection permission notification to the user terminal 20 (step S203), and the user terminal 20 starts communications using the tunnel T1 (step S204). On the other hand, when the user authentication request is not from the appropriate user (step S202: No), the network control device 50 issues a connection rejection notification to the user terminal 20 (step S205).

Specifically, when starting the communications using the virtual tunnel, the user terminal 20 transmits an authentication request to the authentication processing unit 56 of the network control device 50, and the authentication processing unit 56 executes the authentication processing on the basis of the information included in the authentication request. The authentication request includes at least one of the user identifier (carrier network user ID), the terminal ID, or the tunnel identifier (connection destination VNI) for identifying the virtual tunnel set to the user terminal 20, issued from the network control device 50.

Modification of Communication System

Hereinafter, a modification of the communication system 10 will be described.

In the description given above with reference to FIG. 9, the network control device 50 executes the authentication processing. Alternatively, a user management function unit that executes the authentication processing may be provided separately from the network control device 50.

Figure 10:
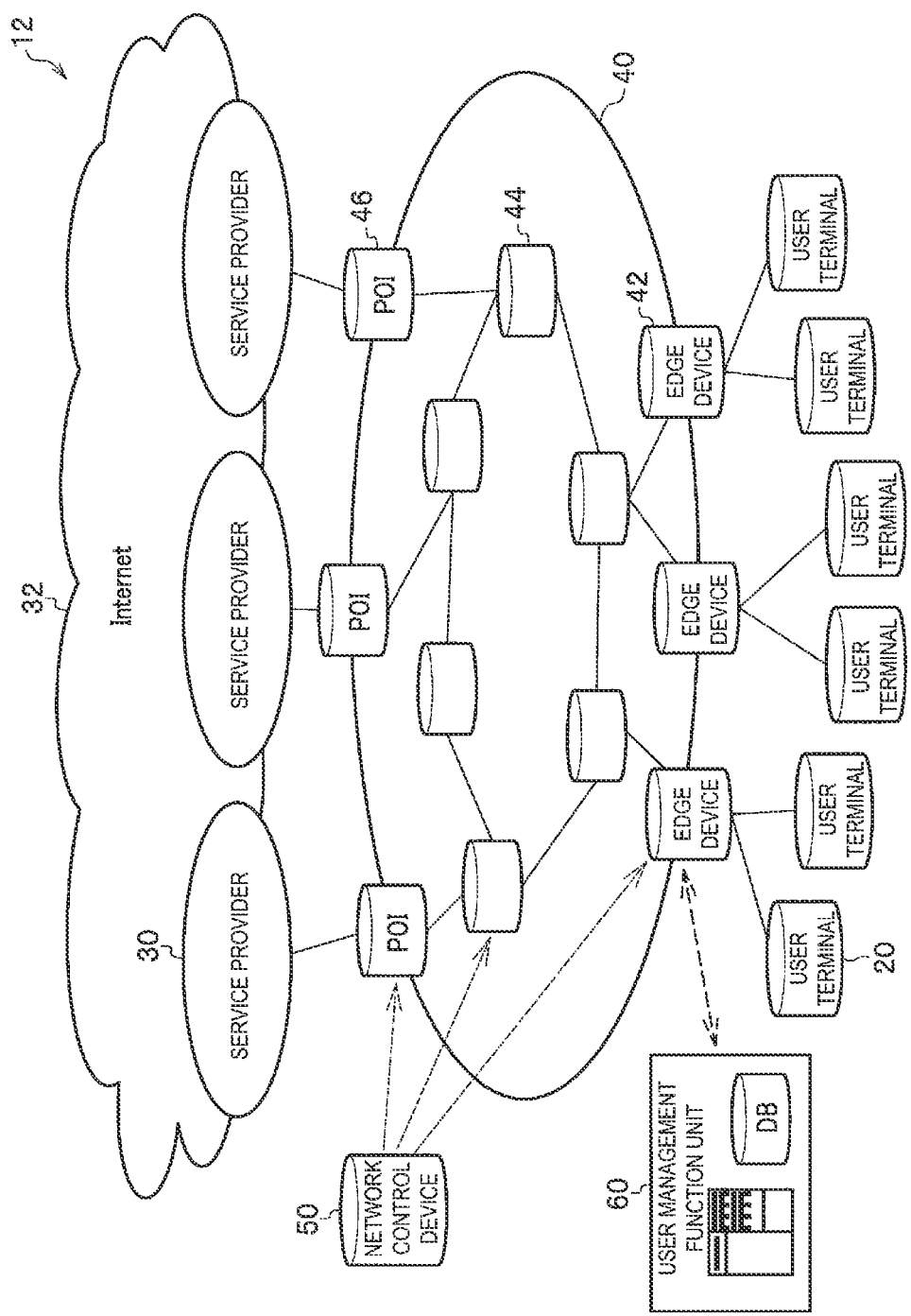
FIG. 10 is a diagram illustrating another example of the configuration of the communication system according to the present embodiment.

FIG. 10 is a diagram illustrating another example (modification) of the configuration of the communication system.

This communication system 12 illustrated in FIG. 10 includes a user management function unit 60 in addition to the configuration (such as the user terminal 20, the service provider 30, the carrier network 40, and the network control device 50) of the communication system 10 illustrated in FIG. 1. The user management function unit 60 is implemented as a single server storing the user management information 600 or as a function of a network device storing the user management information 600 as a database.

The user management function unit 60 is connected to the edge device 42 of the carrier network 40, for example.

Figure 11:
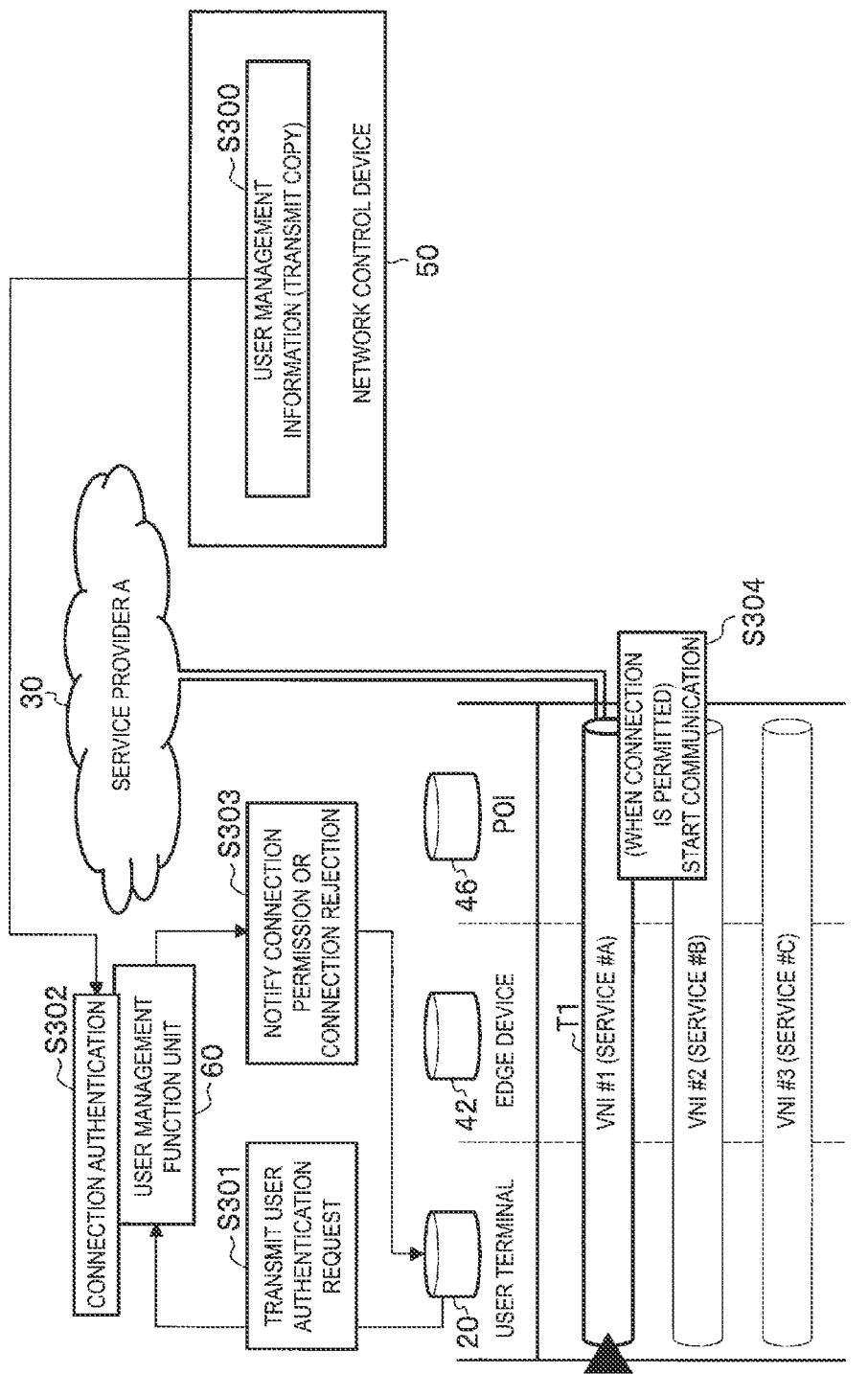
FIG. 11 is an explanatory diagram illustrating a flowchart of processing executed in user authentication using a user management function unit.

FIG. 11 is an explanatory diagram illustrating a flowchart of processing executed in user authentication using the user management function unit 60.

The network control device 50 transmits a copy of the user management information 600 in FIG. 6 to the user management function unit 60 (step S300), and the user management function unit 60 stores the copy of the user management information 600. Each time the information in the user management information 600 is changed, the network control device 50 reflects the change in the user management information 600 (copy) (updates the user management information 600 (copy)) in the user management function unit 60.

Next, the user terminal 20 transmits a user authentication request to the user management function unit 60 (step S301). The user authentication request includes a carrier network user ID, a terminal ID, a MAC address, an IP address, and a connection destination VNI of the user terminal 20.

The user management function unit 60 checks the information included in the user authentication request against the user management information 600 (copy) in FIG. 6, to determine whether the user authentication request is from an appropriate user (step S302, connection authentication).

When the user authentication request is from the appropriate user, the user management function unit 60 issues a connection permission notification to the user terminal 20 (step S303), and the user terminal 20 starts communications using the tunnel T1 (step S304).

On the other hand, when the user authentication request is not from the appropriate user, the user management function unit 60 issues a connection rejection notification to the user terminal 20 (step S303).

As described above, the user management function unit 60 may be provided and execute the user authentication processing instead of the network control device 50 in the tunnel operation. As a result, a processing load on the network control device 50 can be reduced.

Effects of the Present Invention

Figure 12:
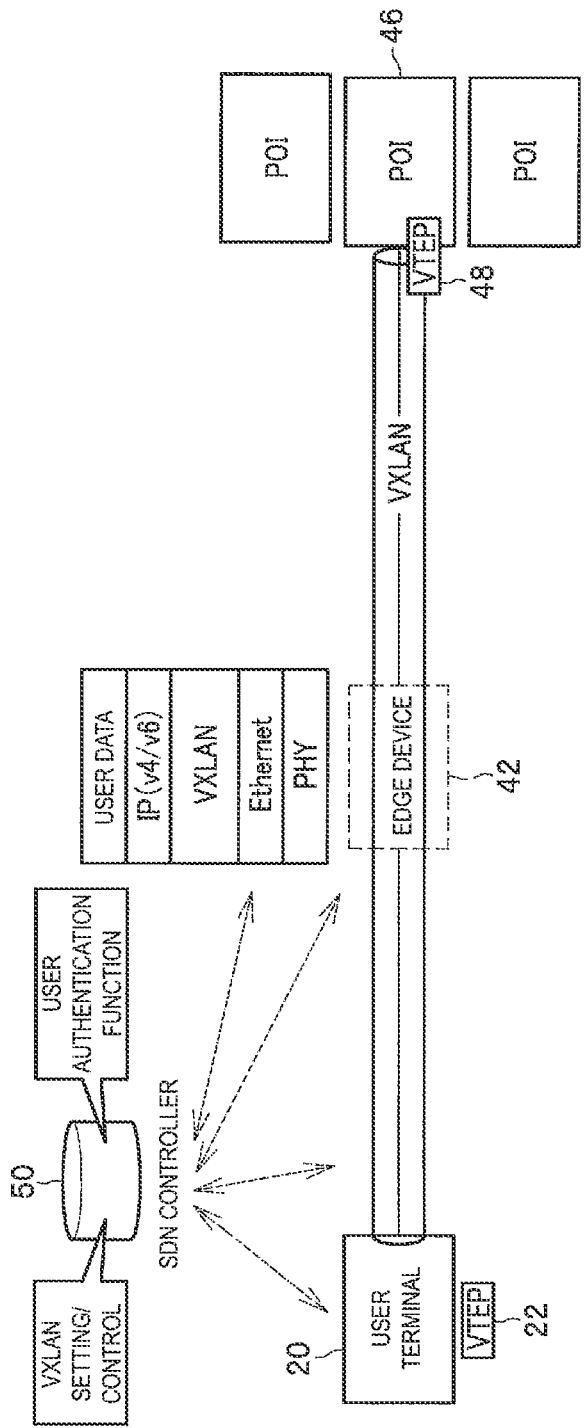
FIG. 12 is an explanatory diagram schematically illustrating a protocol stack for a tunnel connection scheme in the communication system according to the present embodiment.
Figure 13:
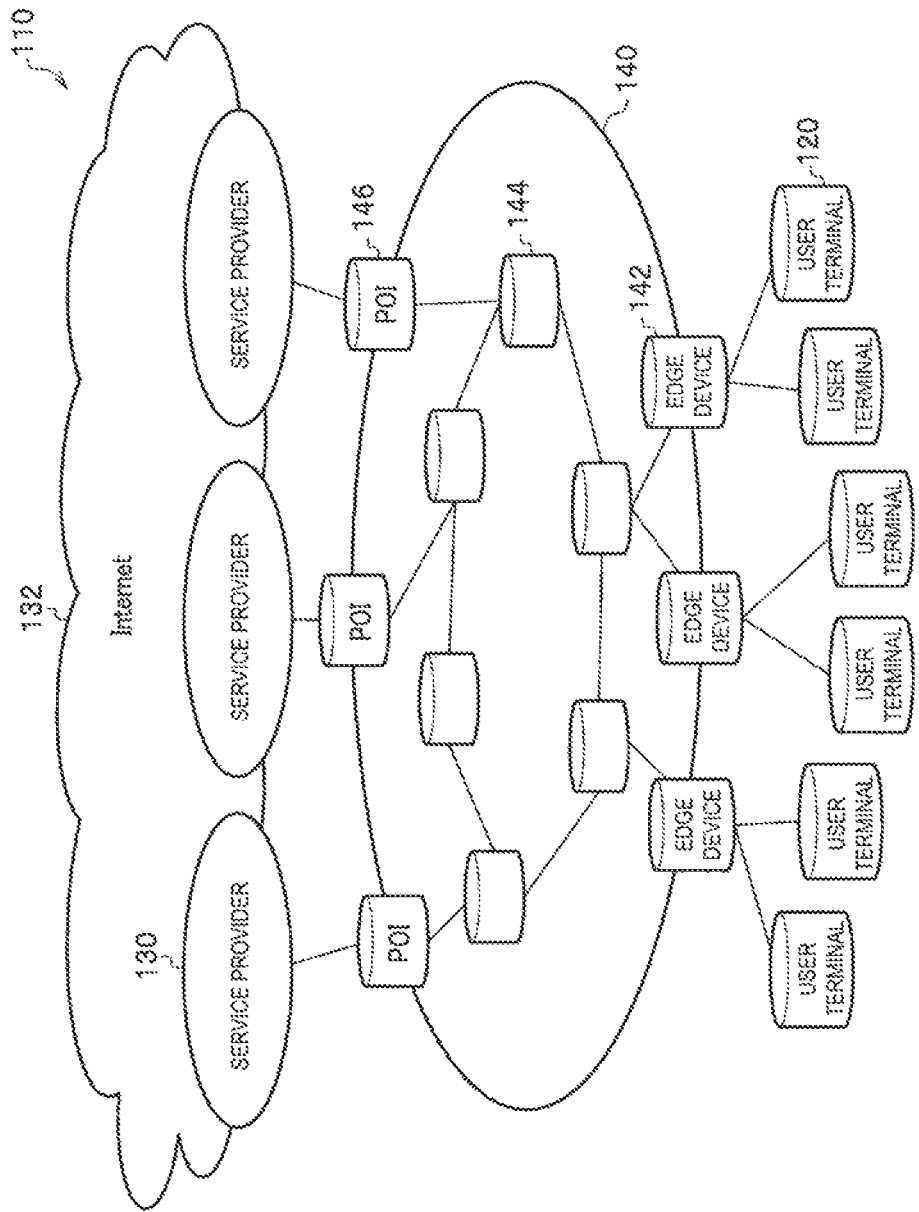
FIG. 13 is an explanatory diagram illustrating a configuration of a communication system according to a conventional art.

FIG. 12 is an explanatory diagram schematically illustrating a protocol stack for a tunnel connection scheme in the communication system 10.

Figure 14:
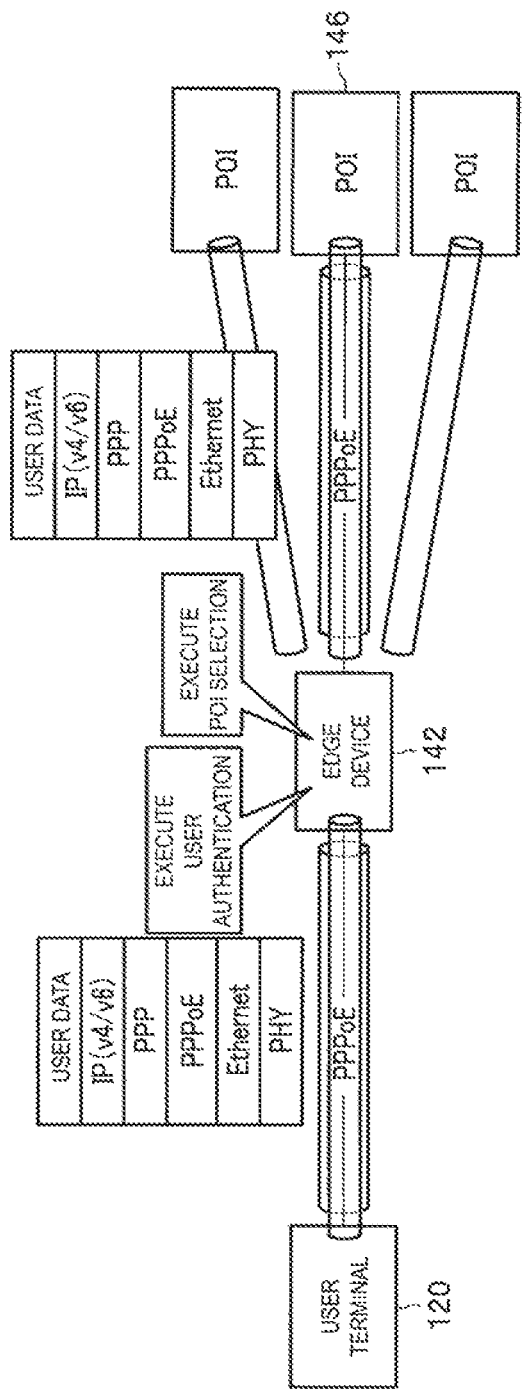
FIG. 14 is an explanatory diagram schematically illustrating an example of a protocol stack for a tunnel connection scheme according to the conventional art.

In the communication system 10 according to the present embodiment, the VXLAN tunnel between the user terminal 20 and the POI terminal 46 is set by the network control device 50, and thus data transmits through the edge device 42 and the relay device 44. This allows the functions (configurations) related to path control to be reduced, compared with those used in the conventional art (see FIG. 14).

Furthermore, the network control device 50 (SDN controller) is in charge of the user authentication function, which eliminates the need for the processing in the edge device 42 required for the user authentication in the conventional art. This also allows the functions (configurations) related to the authentication to be reduced.

Thus, with the communication system 10 according to the present embodiment, the function (configuration) involved with the path control and the authentication can be simplified, thereby reducing failure risk and operation risk.

Furthermore, with the VXLAN used in the tunnel scheme, the protocol stack can be simplified. In particular, in recent years, VXLAN has been actively implemented in SDN technologies or SDN apparatuses on the market (such as a general-purpose switch or the like), and thus applying the present technique enables network establishment with general-purpose switches having a simpler function yet featuring a lower cost, compared with conventional devices (a large router manufactured by a vendor).

REFERENCE SIGNS LIST

10, 12 Communication system
20 User terminal
22,48 Virtual tunnel end point (VTEP)
30 Service provider
40 Carrier network
42 Edge device
44 Relay device
46 POI terminal
50 Network control device
52 Virtual network setting unit
54 Virtual tunnel setting unit
56 Authentication processing unit
60 User management function unit
300 Registered user information
400 POI accommodation information
500 Correspondence table
510 VTEP deployment information
600 User management information
700 Device address management information

The invention claimed is:

1. A network control device configured to control a carrier network connecting a user terminal and a service provider to each other, the network control device comprising:
a virtual network setting unit configured to set a virtual network on the carrier network; and
an authentication processing unit configured to execute authentication processing based on authentication information transmitted from the user terminal, when communications using a virtual tunnel are started,
wherein the virtual network setting unit includes a virtual tunnel setting unit configured to set respective virtual tunnel end points for a point of interface that is on the carrier network and that is connected to the service provider and for the user terminal, and to set the virtual tunnel between the virtual tunnel end points.

2. The network control device according to claim 1,
wherein the network control device stores a service identifier for identifying the service provider and the point of interface connected to the service provider in association with each other,
wherein the network control device stores a user identifier for identifying the user terminal and the service identifier of the service provider connected to the user terminal in association with each other, and
wherein the virtual tunnel setting unit of the network control device identifies the user terminal based on the user identifier to set one of the virtual tunnel end points for the user terminal and sets another one of the virtual tunnel end points for the point of interface associated with the service identifier of the service provider connected to the user terminal.

3. The network control device according to claim 1, wherein the authentication processing unit executes the authentication processing using, as the authentication information, information including at least one of a user identifier for identifying the user terminal, a terminal identifier unique to the user terminal, or a tunnel identifier for identifying the virtual tunnel set for the user terminal.

4. A user terminal configured to be connected to a network control device configured to control a carrier network connecting the user terminal and a service provider to each other and to be connected to the service provider via the carrier network on which a virtual network is formed, the network control device comprising:
a virtual network setting unit configured to set the virtual network on the carrier network; and
an authentication processing unit configured to execute authentication processing based on authentication information transmitted from the user terminal, when communications using a virtual tunnel are started,
wherein the virtual network setting unit includes a virtual tunnel setting unit configured to set respective virtual tunnel end points for a point of interface that is on the carrier network and that is connected to the service provider and for the user terminal, and to set the virtual tunnel between the virtual tunnel end points, and
wherein virtual tunnel end points of the virtual tunnel set by the network control device between the user terminal and the service provider are set, and the user terminal communicates with the service provider via the virtual tunnel.

5. The user terminal according to claim 4,
wherein the network control device stores a service identifier for identifying the service provider and the point of interface connected to the service provider in association with each other, wherein the network control device stores a user identifier for identifying the user terminal and the service identifier of the service provider connected to the user terminal in association with each other, and wherein the virtual tunnel setting unit of the network control device identifies the user terminal based on the user identifier to set one of the virtual tunnel end points for the user terminal and sets another one of the virtual tunnel end points for the point of interface associated with the service identifier of the service provider connected to the user terminal.

6. A communication system comprising:

a user terminal;

a service provider;

a carrier network configured to connect the user terminal and the service provider to each other; and a network control device configured to control the carrier network, wherein the network control device includes a virtual network setting unit configured to set a virtual network on the carrier network, wherein the virtual network setting unit includes a virtual tunnel setting unit configured to set respective virtual tunnel end points for a point of interface that is on the carrier network and that is connected to the service provider and for the user terminal, and to set a virtual tunnel between the virtual tunnel end points, wherein the network control device includes an authentication processing unit configured to execute authentication processing based on authentication information transmitted from the user terminal, when communications using a virtual tunnel are started, and wherein the user terminal communicates with the service provider via the virtual tunnel set by the network control device.

7. The communication system according to claim 6, wherein the network control device stores a service identifier for identifying the service provider and the point of interface connected to the service provider in association with each other, wherein the network control device stores a user identifier for identifying the user terminal and the service identifier of the service provider connected to the user terminal in association with each other, and wherein the virtual tunnel setting unit of the network control device identifies the user terminal based on the user identifier to set one of the virtual tunnel end points for the user terminal and sets another one of the virtual tunnel end points for the point of interface associated with the service identifier of the service provider connected to the user terminal.

8. A network control method for a network control device configured to control a carrier network connecting a user terminal and a service provider to each other, the method comprising:

setting, by the network control device, a virtual network on the carrier network;

setting, by the network control device, respective virtual tunnel end points for a point of interface that is on the carrier network and that is connected to the service provider and for the user terminal, and setting a virtual tunnel between the virtual tunnel end points; and executing, by the network control device, authentication processing based on authentication information transmitted from the user terminal, when communications using the virtual tunnel are started.

9. The network control method according to claim 8, comprising:

identifying, based upon a service identifier, the service provider and the point of interface connected to the service provider in association with each other;

identifying, based upon a user identifier, the user terminal and the service identifier of the service provider connected to the user terminal in association with each other;

identifying the user terminal based on the user identifier; and setting one of the virtual tunnel end points for the user terminal and setting another one of the virtual tunnel end points for the point of interface associated with the service identifier of the service provider connected to the user terminal.

10. A non-transitory, computer-readable medium storing one or more instructions executable by a computer system to perform operations comprising:

setting a virtual network on a carrier network;

setting respective virtual tunnel end points for a point of interface that is on the carrier network and that is connected to a service provider and for a user terminal, and setting a virtual tunnel between the virtual tunnel end points; and executing authentication processing based on authentication information transmitted from the user terminal, when communications using the virtual tunnel are started.

11. The non-transitory, computer-readable medium according to claim 10, comprising operations of:

identifying, based upon a service identifier, the service provider and the point of interface connected to the service provider in association with each other;

identifying, based upon a user identifier, the user terminal and the service identifier of the service provider connected to the user terminal in association with each other;

identifying the user terminal based on the user identifier; and setting one of the virtual tunnel end points for the user terminal and setting another one of the virtual tunnel end points for the point of interface associated with the service identifier of the service provider connected to the user terminal.

* * * * *